United States Patent
Hollocher et al.

(10) Patent No.: US 6,761,069 B2
(45) Date of Patent: *Jul. 13, 2004

(54) FEEDBACK CIRCUIT FOR MICROMACHINED ACCELEROMETER

(75) Inventors: David C. Hollocher, Norwood, MA (US); John Memishian, Newton, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/385,805

(22) Filed: Mar. 11, 2003

(65) Prior Publication Data

US 2003/0167843 A1 Sep. 11, 2003

Related U.S. Application Data

(63) Continuation of application No. 09/645,201, filed on Aug. 25, 2000, now Pat. No. 6,530,275.
(60) Provisional application No. 60/151,730, filed on Aug. 31, 1999.

(51) Int. Cl.[7] .............................................. G01P 15/13
(52) U.S. Cl. ................... 73/514.18; 73/862.61; 73/862.626
(58) Field of Search ...................... 73/514.18, 514.16, 73/514.17, 514.32, 862.61, 862.626; 361/283.3

(56) References Cited

U.S. PATENT DOCUMENTS

| | | | |
|---|---|---|---|
| 5,326,726 A | 7/1994 | Tsang et al. ............... 437/228 |
| 5,345,824 A | 9/1994 | Sherman et al. .......... 73/517 B |
| 5,440,939 A | 8/1995 | Barny et al. .............. 73/862.61 |
| 5,597,956 A | 1/1997 | Ito et al. .................. 73/514.18 |
| 5,612,494 A | * 3/1997 | Shibano .................... 73/514.32 |
| 5,659,262 A | 8/1997 | Memishian ................. 327/307 |
| 5,801,309 A | 9/1998 | Carr et al. ............... 73/514.29 |

FOREIGN PATENT DOCUMENTS

EP          0 718 631 A2      6/1996

OTHER PUBLICATIONS

Leuthold et al., "An ASIC for High–resolution Capacitive Microaccelerometers," Sensors and Actuators, A21/A23, 1990, pp. 278–281.*

Leuthold, H., et al., "An ASIC for High–Resolution Capacitive Microaccelerometers" Sensors and Actuators, vol. A21/A23: (1990); pp. 278–281; XP002013866.

* cited by examiner

Primary Examiner—John E. Chapman
(74) Attorney, Agent, or Firm—Hale and Dorr LLP

(57) ABSTRACT

An accelerometer had a movable electrode between two fixed electrodes to form a differential capacitor. Drivers provide AC drive signals to the fixed electrodes. The movable electrode is coupled through reading circuitry to an output terminal. In response to a sensed acceleration, feedback is provided from the output terminal to one or both drivers to null any AC signal on the movable electrode and to keep the electrostatic forces between the movable electrode and each of the fixed electrodes equal.

16 Claims, 12 Drawing Sheets

FEEDBACK CIRCUIT FOR MICROMACHINED ACCELEROMETER

CROSS-REFERENCE TO RELATED APPLICATION

This application is a continuation of Ser. No. 09/645,201 filed Aug. 25, 2000, now U.S. Pat. No. 6,530,275, which claims priority from provisional application serial No. 60/151,730, filed Aug. 31, 1999 which are incorporated herein by reference.

BACKGROUND OF THE INVENTION

This invention relates generally to circuitry for use with a capacitive sensor, and more particularly for use with a micromachined accelerometer.

Micromachined accelerometers can be used to sense acceleration for a variety of applications, including sensing the acceleration that occurs as a result of an automobile accident in order to trigger an air bag, or sensing the acceleration resulting from an earthquake in order to automatically shut off a gas line to prevent fires. One type of micromachining process is referred to as surface micromachining, a process by which a sensor structure is formed in layers over a substrate using semiconductor processing techniques such as depositing and etching. U.S. Pat. No. 5,326,726 describes such a process and is incorporated herein by reference in its entirety for all purposes.

In one type of micromachined device currently made by the assignee of the present invention, a polysilicon mass is suspended over a substrate by supporting tethers. The mass, which is essentially parallel to the substrate, has a beam elongated along an axis, and a number of fingers that extend away from the beam in a direction perpendicular to the axis of the beam. The beam and fingers are movable laterally relative to the substrate along the axis. Each of these movable fingers is positioned between two polysilicon fingers that are in the plane of the mass and are fixed relative to the substrate. Each movable finger and the fixed fingers on either side of the movable finger form a differential capacitor cell. The cells additively form a differential capacitor. A structure of this type is shown, for example, in U.S. Pat. No. 5,345,824, which is incorporated herein by reference in its entirety and for all purposes.

Different approaches can be used to sense acceleration with such a differential capacitor. One approach is to use force feedback, as described in U.S. Pat. No. 5,345,824. The movable fingers (i.e., movable with the mass) are each centered between two fixed fingers. All the fixed fingers on one side of the movable fingers are electrically coupled together, and all the fixed fingers on the other side of the movable fingers are also electrically coupled together. The two sets of fixed fingers are at different DC potentials and are driven with AC carrier signals that are 180° out of phase with respect to each other.

In response to an external force/acceleration along a sensitive axis, the mass with movable fingers moves toward one or the other set of fixed fingers. The signal on the beam is amplified, demodulated, and provided to an output terminal. A feedback network connects the output terminal and the beam. The feedback causes the movable fingers to be re-centered between the two sets of fixed fingers. The signal at the output terminal is a measure of the force required to re-center the beam, and is therefore proportional to acceleration.

One alternative to this closed-loop force feedback circuit is an open-loop circuit. As shown in prior art FIG. 1, a sensor cell 10 has a movable electrode 12 between a first electrode 14 and a second electrode 16. As shown also in U.S. Pat. No. 5,659,262, which is expressly incorporated herein by reference in its entirety and for all purposes, electrodes 14 and 16 are driven by respective drivers 18 and 20. Each driver provides a 100 kHz square wave that alternates between two voltages, e.g., 0 volts and 5 volts. The signals from the drivers are 180° out of phase, such that one set of finger is at 0 volts while the other is at 5 volts.

In response to an acceleration, the beam moves toward one set of electrodes 14, 16, causing an AC output signal to appear on the beam. This signal is a square wave signal that is in phase with the driver signal of whichever electrode 14, 16 toward which electrode 12 moves, and has an amplitude on the order of millivolts. The amplitude is approximated proportional to acceleration for small displacements. The beam signal provided to an amplifier 22 and a demodulator 26 produces an output signal in terms of V/g at an output terminal 28, thereby indicating the acceleration.

In this open loop design, because the acceleration is determined from the magnitude of the output signal, it is important that the signal processing circuitry that provides a signal to an output terminal (e.g., an amplifier and demodulator) be precise. For example, the amplifier should have a precise gain, and the circuitry should be insensitive to temperature drift and other factors that can affect the output.

The force feedback described earlier design reduces the need for precise circuitry and substantially reduces problems that can arise due to parasitic capacitive effects. But force feedback has other drawbacks: it does not have ratiometric operation, and a dc bias must usually be applied to the sensor, giving rise to charge-induced offset and other undesirable effects. Because the mechanical transfer function is inside the loop, there can be problems with the stability of the loop.

The open loop design has drawbacks as well. Typically, the scale factor is dependent on the parasitic capacitance of the movable electrode and the circuits connected to it. This capacitance includes junction capacitances that vary with voltage and temperature causing scale factor variation. The desired ratiometric behavior is affected, as is the temperature coefficient of scale factor. The drive signals on the first and third electrodes also create electrostatic forces that vary with the position of the second electrode, effectively altering the mechanical response of the sensor. Since these electrostatic forces change with supply voltage, the output is not strictly ratiometric.

SUMMARY OF THE INVENTION

The present invention is a closed loop electromechanical system with a feedback method that electrically rebalances an output signal of a sensor under the force of acceleration without applying a significant force to the sensor. The system has a movable component that is movable relative to another component. This feedback is accomplished by unbalancing clock signals applied to some components of the sensor so as to electrically null the output on the movable component in a manner that does not appreciably change the forces on the movable component. This feedback provides the benefits of closed loop operation, without the use of force feedback, and minimizes the effects of electrostatic forces on scale factor.

The invention includes feedback and driving circuitry, a sensor with feedback and driving circuitry, and methods for performing sensing with a micromachined sensor of the differential capacitor type. The sensor has a movable mass suspended over a substrate and movable relative to the substrate in a manner similar to the aforementioned sensors. The In one aspect, the invention includes a sensor with first, second, and third electrodes with the second electrode movable relative to the first and third electrodes to form a differential capacitor, first and second drivers for providing drive signals to the first and third electrodes, signal processing circuitry coupled between the second electrode and an output terminal, and a feedback circuit coupled between the output terminal and at least the first driver to control the drive signal amplitude to the first electrode. The drive signals from the first and second drivers are preferably square waves, with one drive signal 180° out of phase with the other drive signal. The circuitry from the second electrode to the output terminal preferably includes an amplifier and a demodulator.

The feedback adjusts the amplitude of one (or preferably both) drivers to null the signal on the second electrode. The feedback causes the amplitude of one or both drive signals to be adjusted, preferably in such a way that there is substantially no AC force and no change in the static force on the second electrode. The adjustment of the drivers that nulls the second electrode signal has a precise relationship to the motion of the second electrode and the output signal is determined precisely from the amount of adjustment. As a consequence of nulling, the effects of electrostatic forces on scale factor are significantly minimized.

The electrodes are preferably part of a surface micromachined accelerometer that has a movable mass suspended over the substrate and having a movable beam and rows of fingers (in total constituting a second electrode). The first and third electrodes are fingers fixed relative to the substrate and on either side of the fingers extending from the movable beam. The fixed electrodes are driven with high frequency carrier signals that are opposite in phase. The accelerometer can have a single mass movable along one axis, two or more masses, or one or more masses movable along multiple axes.

The invention also includes a method for sensing acceleration with a capacitive sensor that has a first electrode, a second electrode, and a third electrode, with the second electrode being between and movable relative to the first and third electrodes to form a differential capacitor, and drivers for providing drive signals to the first and third electrodes. The method includes processing a signal on the second electrode and providing feedback to one or preferably both of the drivers, preferably to null the AC signal on the second electrode without creating an AC force or changing the electrostatic forces on the second electrode.

The invention also includes a micromachined sensor with a substrate, and first, second, and third electrodes suspended over the substrate with the second electrode movable with respect to the first and third electrode. Circuitry that is preferably integrated into the same substrate as the sensor includes drivers for providing signals to the first and third electrodes, circuitry for processing a signal on the second electrode and for providing a signal from the second electrode to an output terminal, and feedback circuitry between the output terminal and the driver to control the signal from the driver. The drivers provide to the first and third electrode periodic signals, preferably square waves, 180° out of phase to each other. The feedback signal controls the drivers to change the amplitude of at least one of the periodic signals, preferably to null the signal on the second electrode without creating an AC force or changing the static forces on the second electrode.

The circuitry of the present invention can take a number of different forms. For example, the circuitry can include one or two opamps for receiving the signal from the movable beam. In addition, there are embodiments with one or two differential pairs of transistors, and embodiments with no opamps or transistors. Another embodiment combines the amplifying and demodulating circuitry with driver circuitry. These different circuits have different benefits and drawbacks, such as accuracy, sensitivity, the ability to change sensitivity, space, and number of components. The embodiments of the circuits have in common the ability to adjust the amplitude of at least one periodic signal provided to an electrode in response to an input signal from another electrode.

The sensor and circuitry of the present invention have a number of benefits. The system has the advantages of a closed feedback network, and can be made ratiometric (the scale factor of volts to g's changes in proportion to the power supply voltage), independent of mechanical forces, and avoids the need for a DC bias relative to the drive signals on the beam. The feedback is provided to at least one driver, and preferably is provided to each driver, to null the signal on a movable beam so that the signal has no AC component in response to a sensed acceleration. With substantially no such AC component, parasitic capacitances on the movable electrode have minimal effect on the resulting output signal. With this system, less precision is required in the processing circuitry compared to other designs in that the amplifier need not have a precise gain, and the gain of the circuitry need not be insensitive to temperature. Consequently, the processing circuitry can be simplified relative to the processing circuitry used, for example, in an open-loop design. Other features and advantages will become apparent from the following detailed description, drawings and claims.

DETAILED DESCRIPTION

The present invention relates to circuitry, a sensor including circuitry, and a sensing method. The invention is described below for use with a surface micromachined accelerometer, but it could be used with other capacitive sensors.

Figure 1:
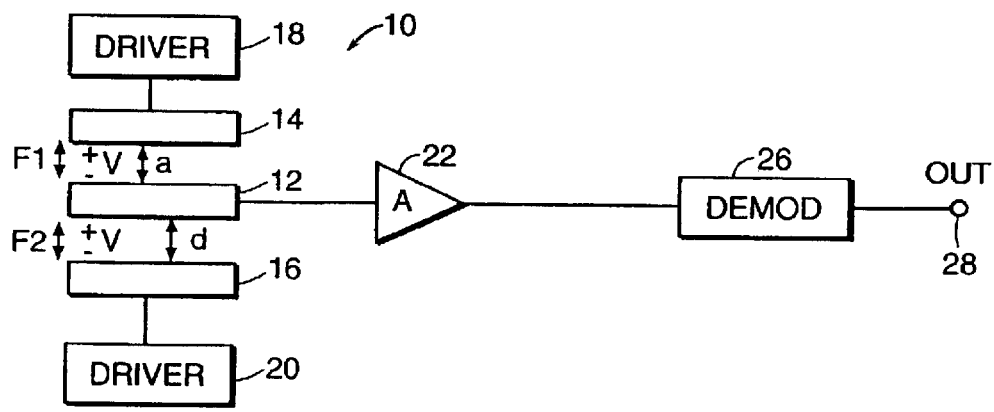
FIG. 1 is a schematic block diagram showing a prior art open-loop circuit.
Figure 2:
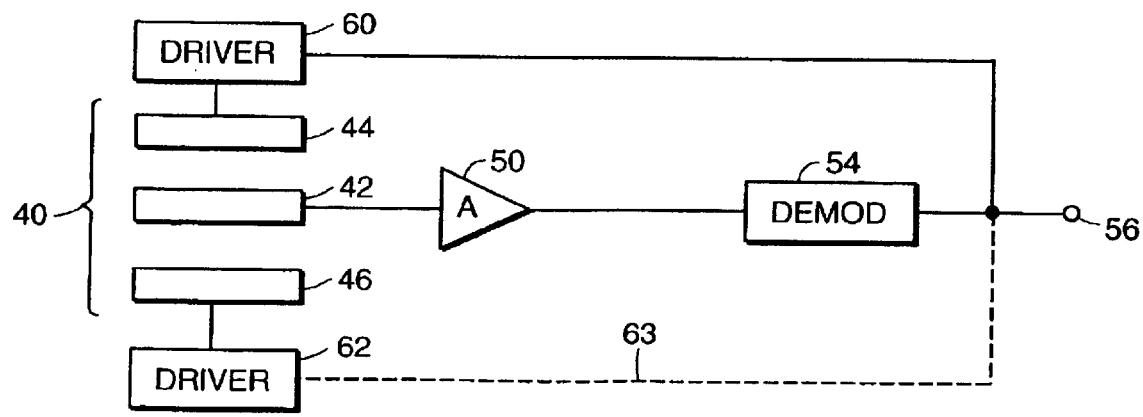
FIG. 2 is a schematic block diagram of a sensor with circuitry according to the present invention.

Referring to FIG. 2, in a system according to the present invention, a sensor 40 has a movable electrode 42 that is between a first electrode 44 and a second electrode 46 to form a differential capacitor. The first and second electrodes 44, 46 are fixed relative to each other, while electrode 42 moves between electrodes 44, 46 in response to an external force. Movable electrode 42 is coupled to a high gain AC amplifier 50 and a demodulator 54, the output of which is provided to an output terminal 56. Drivers 60 and 62 each provide a high frequency (e.g., 100 KHz) carrier, preferably a square wave. The carrier signals are equal or similar in amplitude and 180° out of phase. Output terminal 56 is coupled to driver 60, and it is preferably also coupled to driver 62 as indicated by dashed line 63. If feedback is provided to only one driver, the other driver can be a trimmable driver similar to that described in the incorporated U.S. Pat. No. 5,659,262 for balancing electrostatic forces between electrode 42 and electrodes 44 and 46 and nulling the offset.

Figure 3:
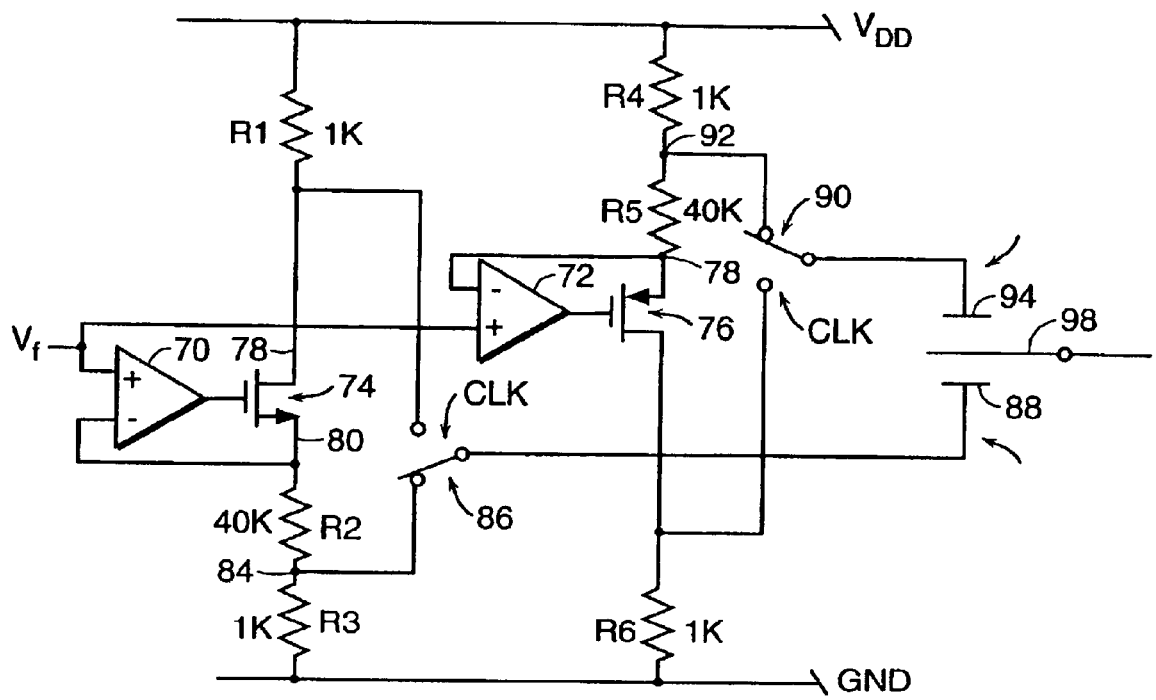
FIGS. 3, 4, 5, 8, 9, and 10 are schematics of embodiments of the driver circuitry of FIG. 2.

FIG. 3 illustrates a more detailed view of drivers 60 and 62 (shown combined together) for providing signals to first and second fixed electrodes 88 and 94 according to a first embodiment of the present invention. A feedback voltage $V_f$ is provided to non-inverting inputs of opamps 70 and 72. The outputs of opamps 70 and 72 are connected to the gates of n-type transistor 74 and p-type transistor 76, respectively. Transistor 74 has a drain terminal coupled to a supply voltage $V_{DD}$ through a resistor R1. A source terminal 80 of transistor 74 is coupled to the inverting terminal of opamp 70 and to ground through resistors R2 and R3. The drain of transistor 74 and a node 84 between resistors R2 and R3 are each coupled to a clocked switch 86, the output of which is connected to first fixed electrode 88.

Transistor 76 has a source terminal 78 coupled to supply voltage $V_{DD}$ through resistors R4 and R5, and coupled to the inverting terminal of opamp 72. The drain of transistor 76 is connected to ground through resistor R6. The drain of transistor 76 and a node 92 between resistors R4 and R5 are each coupled to a clocked switch 90, the output of which is connected to second fixed electrode 94.

While this circuit has two opamps, the design of the opamps is rather simple because the opamps in this design do not need to drive a resistive load.

Figure 3A:
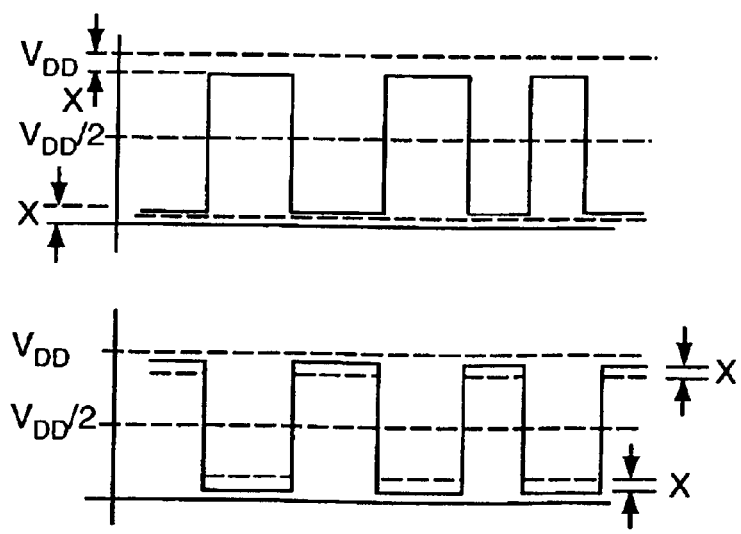
FIG. 3A shows graphs of waveforms on the electrodes for the circuitry of FIGS. 3 and 4.

The operation of the circuitry in FIG. 3 is described also with reference to the waveforms in FIG. 3A. When there is no external acceleration on movable electrode 98, the signal $V_f$ that is fed back equals $V_{DD}/2$. Voltage $V_f$ also appears at the source of transistor 74, which means that the voltage across resistor R3 is $(V_f)(R3)/(R2+R3)$. Because R3=R1, the voltage drops across resistors R3 and R1 are the same. Resistor R2 has a value that is much higher than that of resistor R3, so the voltage across resistors R1 and R3 is low relative to $V_f$. If the voltage drop across resistors R1 and R3 is x, clocked switch 86 generates a square wave that alternates in amplitude between x and $V_{DD}-x$. The circuitry for providing voltage to clocked switch 90 is similar to that for clocked switch 86, except that in this case $V_f$ is referenced to supply voltage $V_{DD}$ rather than being referenced to ground. As indicated in FIG. 3, examples of resistor values are R1=R3=R4=R6=1 kohm; and R2=R4=40 kohm. Assuming that $V_{DD}$ equals 5 volts, and therefore with no acceleration $V_f$=2.5 volts, the voltage x across resistors R1 and R3 is about 60 millivolts, so the clocked signals alternate between 0.06 volts and 4.94 volts. Referring also to FIG. 3A, as $V_f$ increases or decreases in response to movement by electrode 98, one of the square waves will have a higher maximum and lower minimum, and the other will have a lower maximum and a higher minimum. For each electrode, the voltage is still centered on $V_{DD}/2$.

A positive $V_f$ means that movable electrode 98 moves closer to fixed electrode 88, thus requiring a higher drive signal on fixed electrode 94 in order to maintain the equality of the electrostatic forces between the movable electrode and each of the fixed electrodes without a differential voltage output on electrode 98. In a micromachined sensor, a full range for the output may be on the order of 10–20 millivolts, so the 60 millivolts above ground and below $V_{DD}$ provides ample room for such output.

Figure 4:
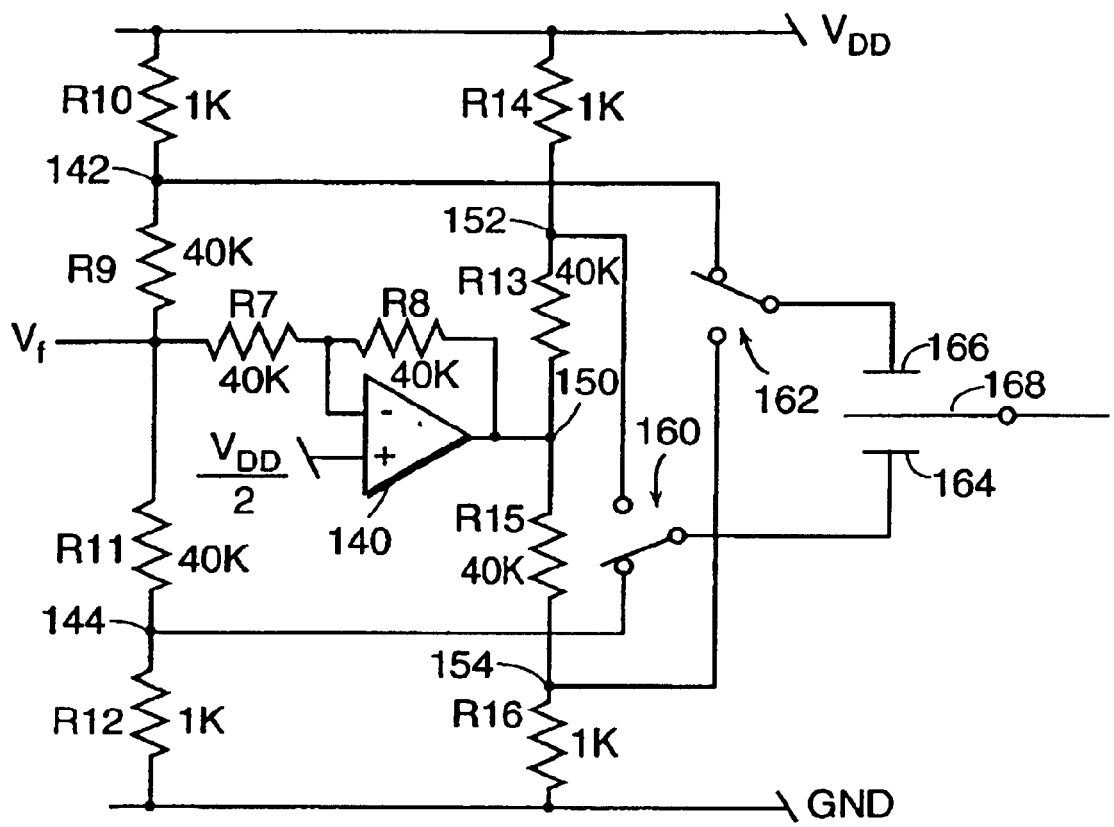

FIG. 4 shows a second embodiment of driver circuitry that requires only one opamp and no control transistors. The opamp in this case would be relatively more difficult than those used in the circuit of FIG. 3, because the opamp in the circuit of FIG. 4 does need to drive a resistive load.

The voltage $V_f$ is provided to the inverting terminal of opamp 140 through a resistor R7. The non-inverting input of opamp 140 is coupled to a voltage source of $V_{DD}/2$. The output of opamp 140 is fed back to the inverting terminal through resistor R8. Voltage Vf is also connected to supply voltage $V_{DD}$ through resistors R9 and R10, and to ground through resistors R11 and R12. Between resistors R9 and R10 is a node 142; and between resistors R11 and R12 is a node 144.

The output of opamp 140 is at a node 150 which is coupled to supply voltage $V_{DD}$ through resistors R13 and R14 and to ground through resistors R15 and R16. Between resistors R13 and R14 is a node 152; and between resistors R15 and R16 is a node 154.

The sensor portion has a movable electrode 168 between electrodes 164 and 166 that are fixed relative to each other. The drive signal through electrode 164 is provided through a clocked switch 160 that alternates between inputs from node 144 and node 152. Electrode 166 receives a drive signal through clocked switch 162 that alternates between signals from node 142 and node 154. The resulting drive signals are thus square waves that are equal or similar in amplitude and 180° out of phase.

The waveforms for the circuitry in FIG. 4 are substantially the same as those in FIG. 3A. In the case of FIG. 4, for example, clocked switch 162 will alternate between (a) $V_{DD}$ minus the voltage drop across resistor R10 and (b) the voltage drop across resistor R16, while clocked switch 160 will alternate between (c) $V_{DD}$ minus the voltage drop across resistor R14 and (d) the voltage drop across resistor R12. Similarly, the square waves alternate between 0.06 volts and 4.94 volts.

In both the embodiments of FIG. 3 and FIG. 4, a feedback signal is provided to both drivers with square waves centered about Vdd/2 to change the driver amplitudes in a complementary manner. That is, one driver increases in amplitude by the same amount that the other amplitude decreases. In such embodiments, the AC electrostatic forces are negligible and the change in electrostatic forces with beam position are negligible. This property reduces the possibility of high frequency forces and makes the output response more ratiometric.

Figure 5:
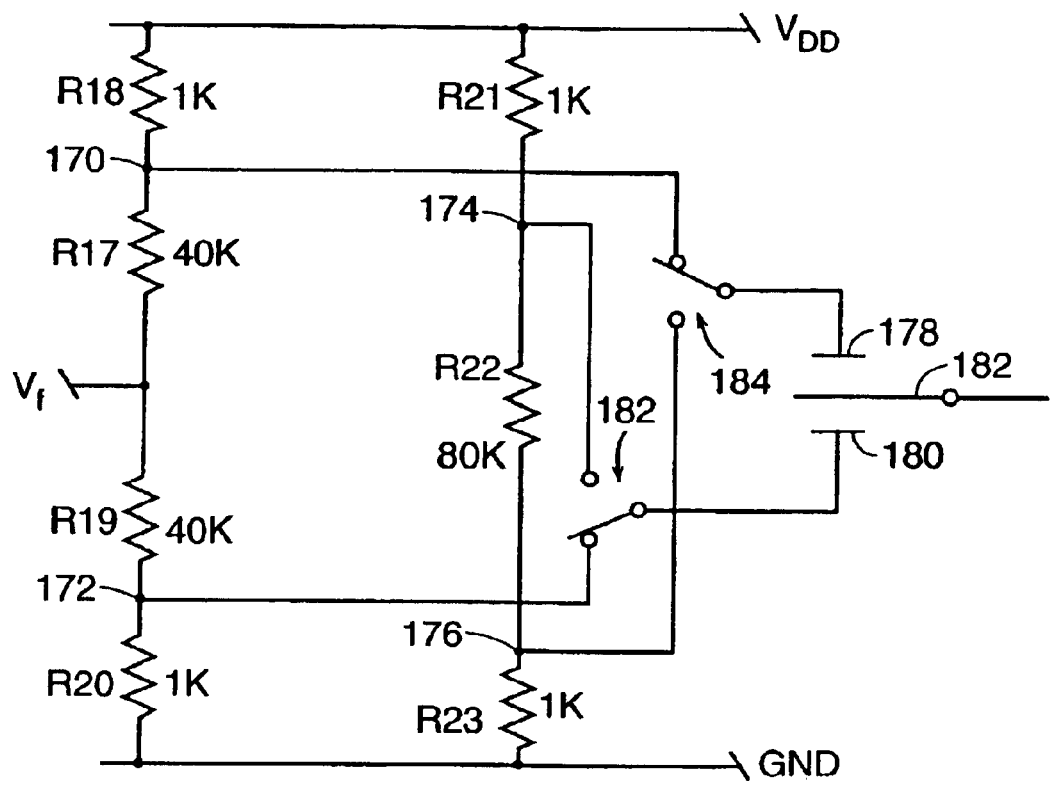

In the embodiment of FIG. 5, neither opamps nor control transistors are needed, although in this case only half of the drive is adjusted. The circuitry is less complex, but unlike the embodiments of FIGS. 3 and 4, the drive signals do not remain symmetric about $V_{DD}/2$ as the beam moves in response to an acceleration. Consequently, there are some AC electrostatic forces and the electrical spring effect that, while reduced, is not eliminated. Voltage $V_f$ is coupled to supply voltage $V_{DD}$ through resistors R17 and R18, and to ground through resistors R19 and R20. A node 170 is between resistors R17 and R18, and a node 172 is between resistors R19 and R20. Supply voltage $V_{DD}$ is also coupled to ground through resistors R21, R22, and R23, with a node 174 between resistors R21 and R22 and a node 176 between resistors R22 and R23.

The sensor has fixed electrodes 178 and 180 and a movable electrode 182 between electrodes 178 and 180 to form a differential capacitor. Electrode 178 receives a drive signal through a clocked switch 184 that alternates between receiving signals from node 170 and 176. Electrode 180 is coupled to clocked switch 186 which alternates between the signals on nodes 172 and 174.

Figure 5A:
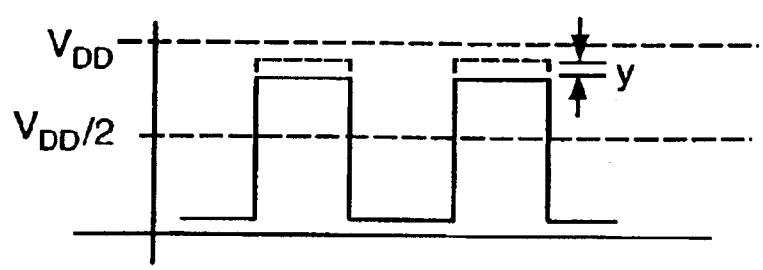
FIG. 5A shows graphs of waveforms on electrodes for the circuitry of FIG. 5
Figure 5A:
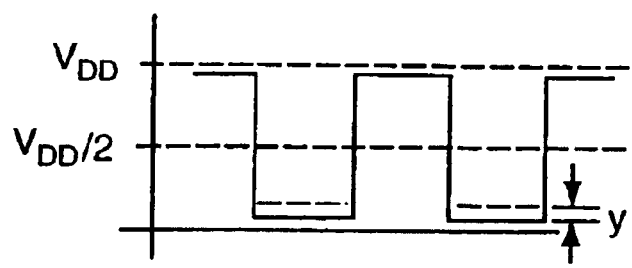

As shown in FIG. 5A, in this embodiment, the drive signals are not centered on $V_{DD}/2$ in response to a charge. One drive signal is increased by an amount y so that the drive signal is slightly above the nominal amount during the high cycles, and the other waveform is decreased by an amount y in response to the feedback during the low value of the drive signal. The effects of these changes are shown by the dashed lines. As indicated, there is a periodic signal with amplitude of y, where $y<<V_{DD}$.

Figure 6:
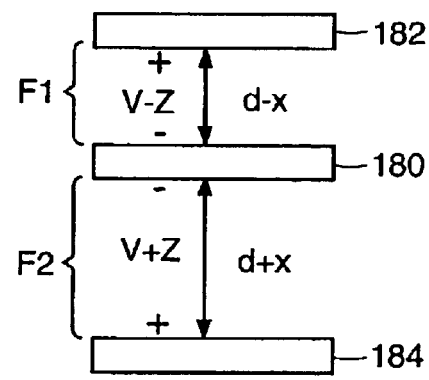
FIG. 6 is a pictorial view illustrating dimensions and forces on beams.

As indicated by FIGS. 3, 4, and 5, a number of different embodiments can be used, although they have in common that a drive voltage to a fixed electrode is controlled through feedback. The embodiments of FIGS. 3 and 4 further have in common that the difference in electrostatic force between each fixed electrode and the movable electrode is eliminated so that the electrical spring effect is eliminated. This elimination of electrostatic forces is illustrated with reference to FIG. 6. A movable electrode 180 is nominally spaced a distance d from fixed electrodes 182 and 184, and there is a nominal voltage of V between each of electrodes 182 and 184 and electrode 180. An externally applied acceleration causes the movable beam to move a distance x toward fixed beam 182. With the feedback according to the present invention, the signal fed back to the drivers changes the amplitude of both clocked drive signals by an amount z, increasing one by z and decreasing the other by z. Because force is approximately proportional to $V^2/d^2$, to equalize the electrostatic forces, $(V-z)^2/(d-x)^2=(V+z)^2/(d+x)^2$. By adjusting the voltages of the clocked drive signals, the forces can be equalized at approximately the same amplitude that nulls the AC signal on movable beam 180. The forces are thus minimized and substantially reduced (e.g., by at least a factor of 10) electrically, as opposed to a mechanical approach of re-centering the electrode with force feedback.

Figure 7:
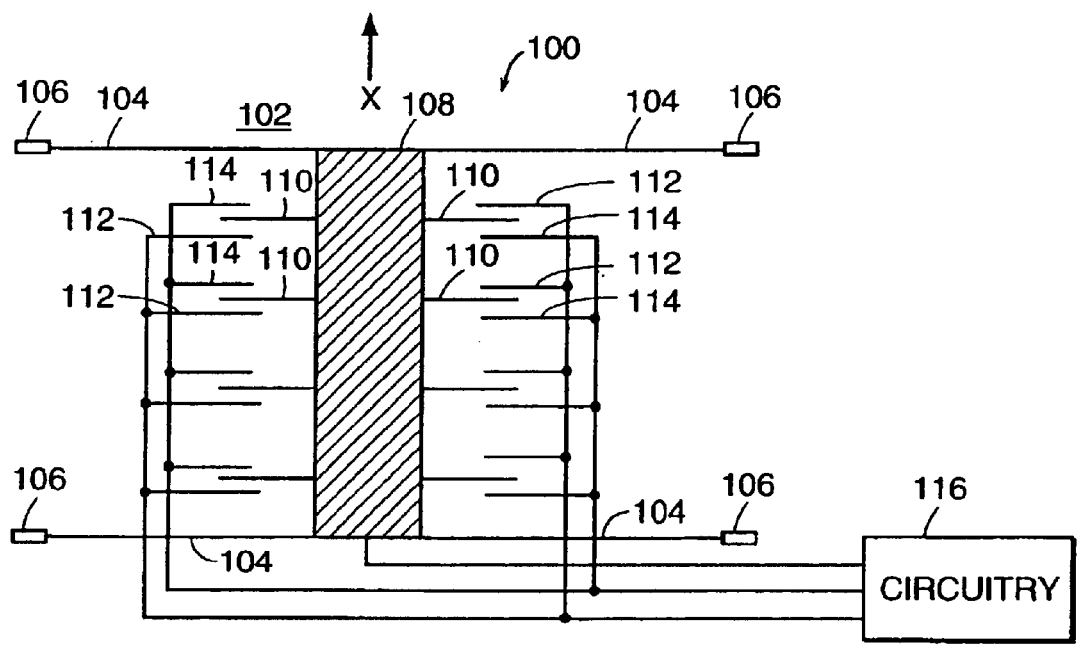
FIG. 7 is a top view of a micromachined sensor according to the present invention.

FIG. 7 shows how the circuitry of the present invention would be used with a surface micromachined accelerometer. FIG. 7 is a highly simplified top view of the sensor portion of a known type of micromachined accelerometer (more detailed views are shown in the incorporated patents), shown here for illustrative purposes, although other structures with differential capacitors could be used. Sensor structure 100 is suspended over a substrate 102 with tethers 104 connected to anchors 106 that extend perpendicular to the substrate. Sensor structure 100 has a central beam 108 movable along the x-axis and movable fingers 110 (that move with beam 108 and are movable relative to the substrate) extending along a direction perpendicular to the x-axis. Fingers 110 are each between two fixed fingers 112 and 114 to form a differential capacitor. Circuitry for forming the drivers and the reading circuitry as described above are also integrated on the substrate and are represented generally as circuitry 116. In response to an acceleration along the x-axis, circuitry 116 controls the signals provided to fingers 112 and 114, preferably so that the signal on the beam has no AC component.

Figure 8:
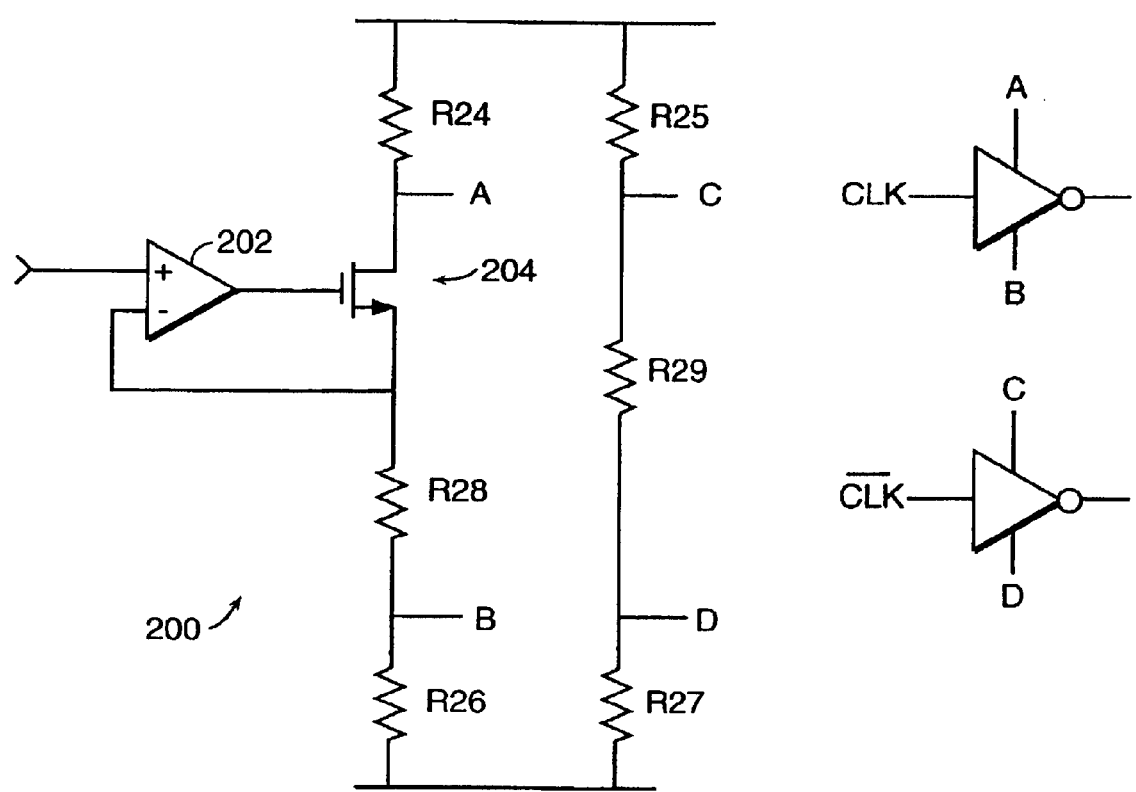
Figure 9:
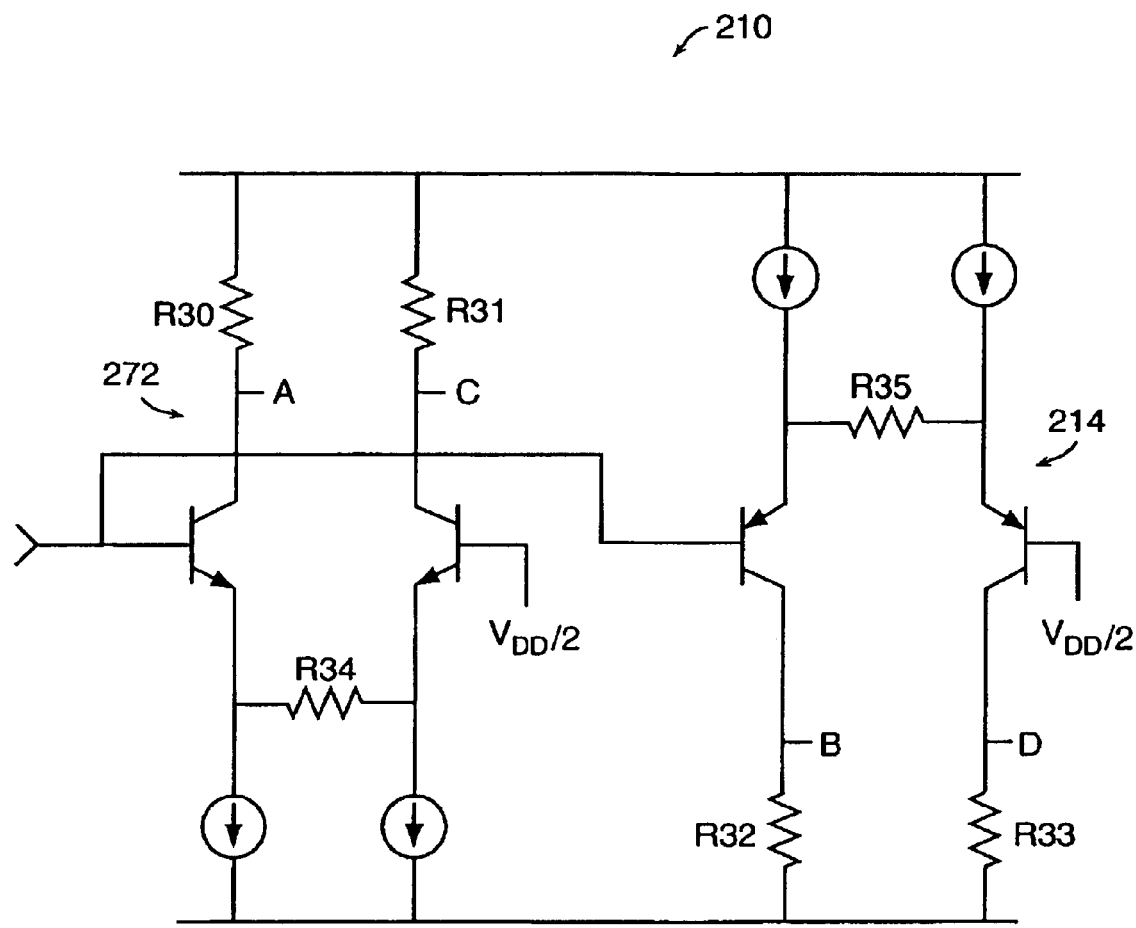
Figure 10:
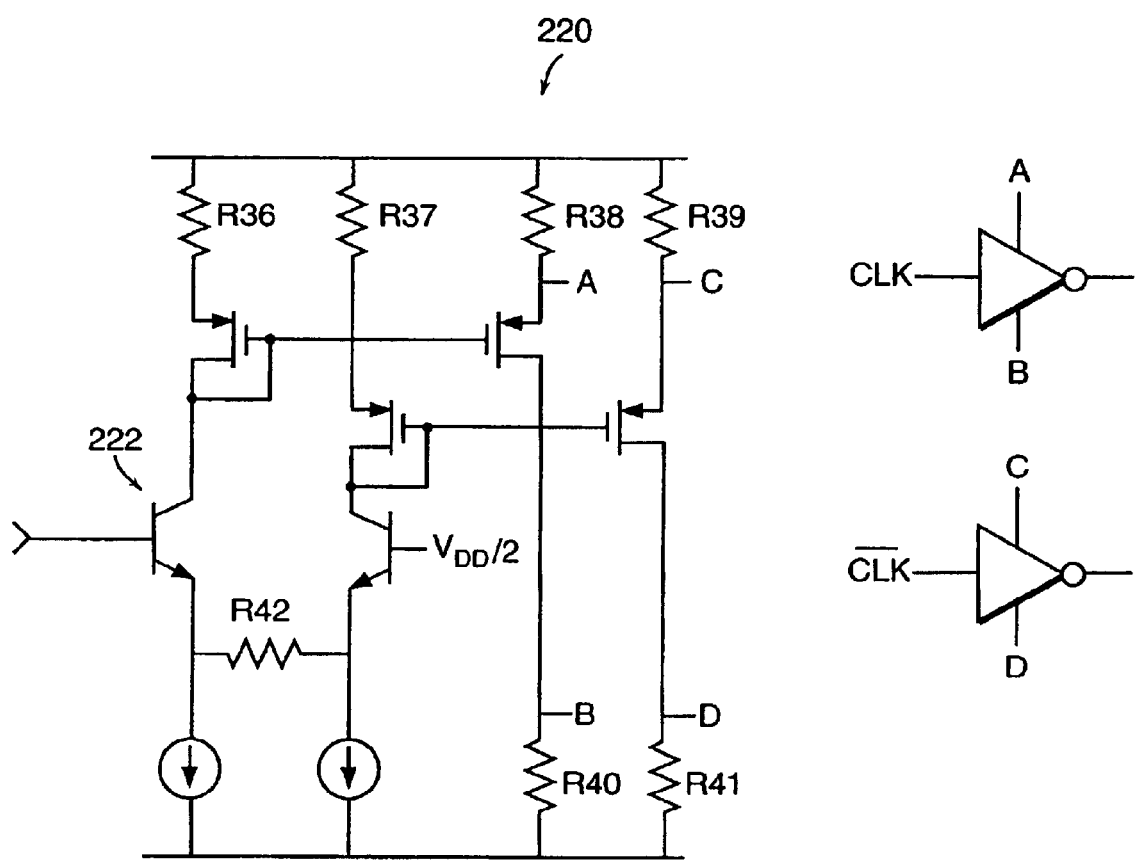

FIGS. 8–10 are schematics of further embodiments of driver circuitry. Circuit 200 in FIG. 8 is similar to that shown in FIG. 5 in that the feedback causes a change in one of the drive signals. In circuit 200, the input signal from the movable electrode is provided to an opamp 202, the output of which is provided to a FET 204. Resistors R24=R25=R26=R27, and these resistors have lower resistance than resistors R28 and R29. In this embodiment, resistor R28 sets the bias, the offset, and the scale. Signals A, B, C, and D correspond to the four signals provided to switches 184 and 186 in FIG. 5. The resulting waveforms are similar to those shown in FIG. 5A.

FIGS. 9 and 10 show embodiments of circuitry having two differential amplifiers or one differential amplifier, respectively. The circuit of FIG. 9 essentially has two differential amplifiers 212 and 214, each of which has a differential transistor pair, with one of the transistors receiving the input signal, and the other receiving a fixed voltage of $V_{DD}/2$ at its base. Resistors R30, R31, R32, and R33 are all equal and are relatively small compared to resistors R34 and R35. Resistors R34 and R35 are used to set the sensitivity of the circuit. A benefit of this circuit is that the sensitivity can be altered without changing other components of the circuitry.

FIG. 10 has a circuit 220 similar to that shown in FIG. 9, except that it has a single differential pair which essentially uses two current mirrors to provide the current through resistors R38 and R40 and through resistors R39 and R41. This circuitry also allows for sensitivity adjustment with resistor R42. This embodiment also avoids the use of opamps, is compact, and allows sensitivity adjustment without changing the rest of the circuitry.

Figure 11:
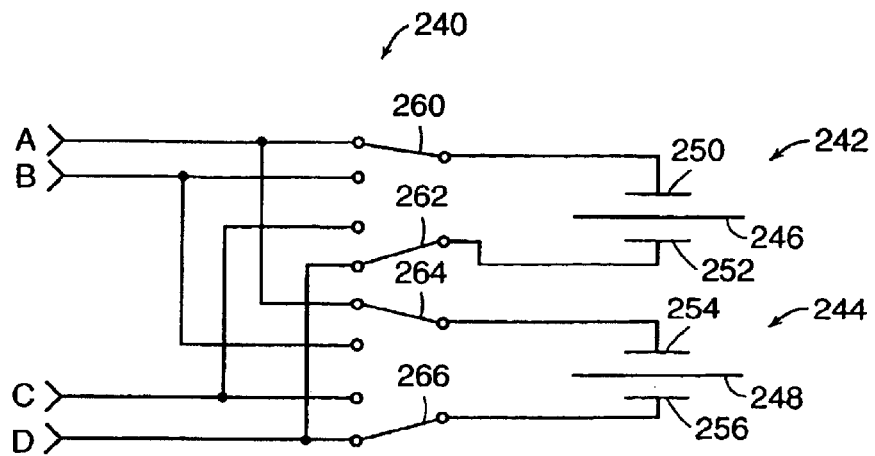
FIGS. 11 and 11A are schematics illustrating the use of the system of the present invention with two differential capacitors.
Figure 11A:
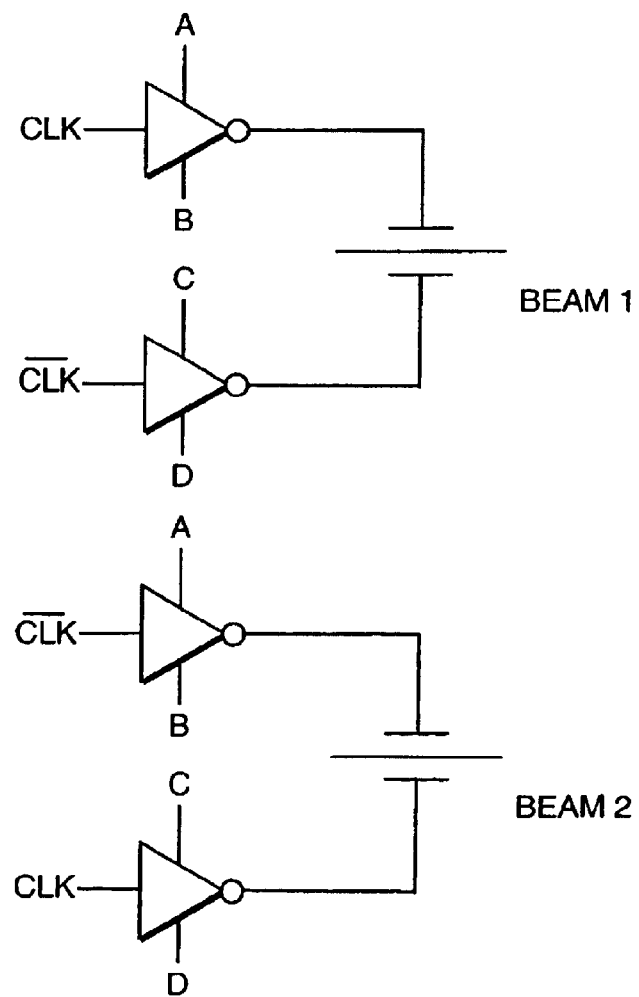

The embodiments described in conjunction with FIGS. 3–5 and 8–10 above each have four signals, with two signals provided to one switch coupled to one electrode, and two other signals coupled to a second switch coupled to a second electrode. As indicated in FIG. 11, the circuitry can be used with a pair of differential capacitive structures. Signals A, B, C, and D set the levels of the square wave drive signals that drive the differential capacitive structures. This arrangement provides differential outputs from the pair. FIG. 11 shows a circuit 240 with a first differential capacitor 242 and a second differential capacitor 244. These capacitors have movable electrodes 246 and 248 and fixed electrodes 250, 252, 254, and 256. Switches 260, 262, 264, and 266 are coupled respectively to fixed electrodes 250, 252, 254, and 256.

Figure 12:
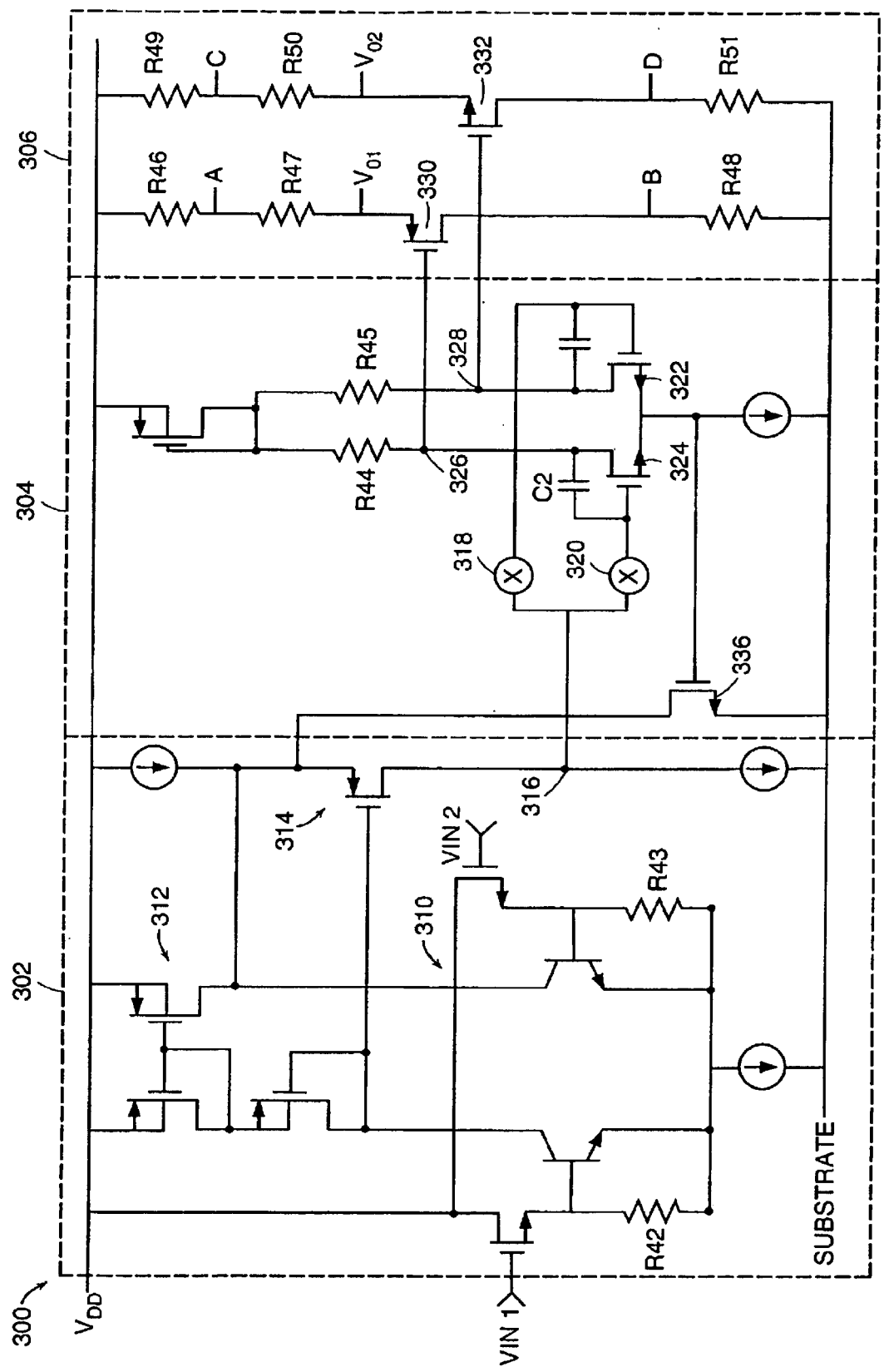
FIGS. 12 and 14 are schematics of an embodiment of the present invention with combined amplifier, demodulator, and driver circuits.

Referring to FIG. 12, in another embodiment of the present invention, the amplifier, demodulator, and driver are effectively combined into a single circuit 300 with an amplifier stage 302, a demodulator stage 304, and a driver stage 306. Amplifier stage 302 has a differential transistor pair 310, a current mirror 312, and a cascode transistor 314. The drain of cascode transistor 314 is at a node 316 which is a high impedance input to demodulator stage 304. The signal at node 316 is provided to switches 318 and 320, which provide the signal in an alternating fashion to integrators 322 and 324. These integrators include respective capacitors C2 and C1 which perform the demodulation and control the loop bandwidth. The sources of the transistors in demodulators 322 and 324 are connected together and to a gate of transistor 336. The drain of transistor 336 is coupled to the source of cascode transistor 314. Transistor 336 provides a feedback to draw current from the source of transistor 314 to set the DC voltage at the sources of transistors 320 and 322 to a fixed bias.

The demodulated signals at nodes 326 and 328 are provided to respective gates of MOS transistors 330 and 332 in driver stage 306. The resulting output signals $V_{O1}$ and $V_{O2}$ are provided at the sources of transistors 330 and 332. These sources are also coupled to supply voltage $V_{dd}$ through resistors R46 and R47, and through resistors R49 and R50, respectively. The drains of transistors 330 and 332 are coupled to the substrate through respective resistors R48 and R51. Resistors R47 and R50 are preferably significantly larger than resistors R46, R48, R49, and R51, which in turn are preferably equal to each other. For example, the resistances of resistors R47 and R46 may have a ratio of about 14:1. The resulting signals A, B, C, and D are provided to clocked switches as described above.

The operation is essentially similar to other embodiments above. The AC signal on the beam is amplified by the differential amplifier stage and demodulated to get a signal that is provided as an output and is scaled down by the ratio of the resistors in the driver stage.

The circuit of FIG. 12 can be used with a single movable beam moving along one axis, with multiple beams in one axis, or with a beam moving along multiple axes. In a single beam embodiment with the beam moving along one axis, one of the inputs to circuit 300 is coupled to $V_{ss}/2$, while the other is coupled to the beam. In the two-beam embodiment, each beam is coupled to one of the inputs to circuit 300.

Figure 13:
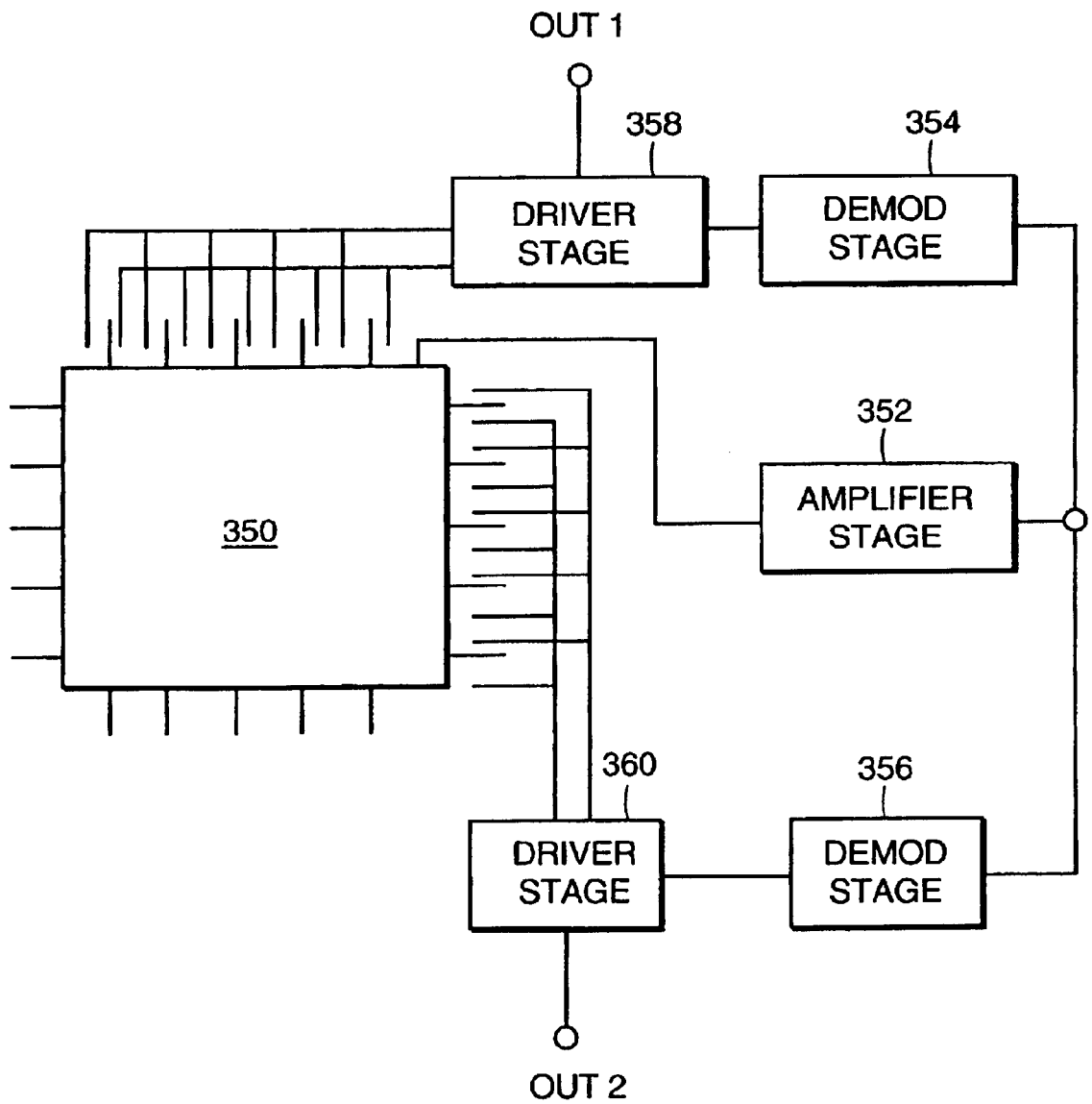
FIG. 13 is a partial block diagram of the circuitry of FIG. 12 used with a two axis sensor.

An embodiment for a single beam that moves along two axes is shown in simplified form in FIG. 13. Beam 350 has sense fingers on each side for sensing movement along an X-axis and a Y-axis. The signal from beam 350 is provided to an amplifier stage 352, and then to two substantially identical demodulator stages 354 and 356, each of which is comparable to stage 304 in the embodiment of FIG. 12. The demodulated output, in quadrature to separate the signals on the two axes, is then provided to driver stages 358 and 360, respectively, each of which is substantially similar to the driver stage 306 in the embodiment of FIG. 312. Thus the circuit of FIG. 12 provides flexibility for different types of accelerometers.

Figure 14:
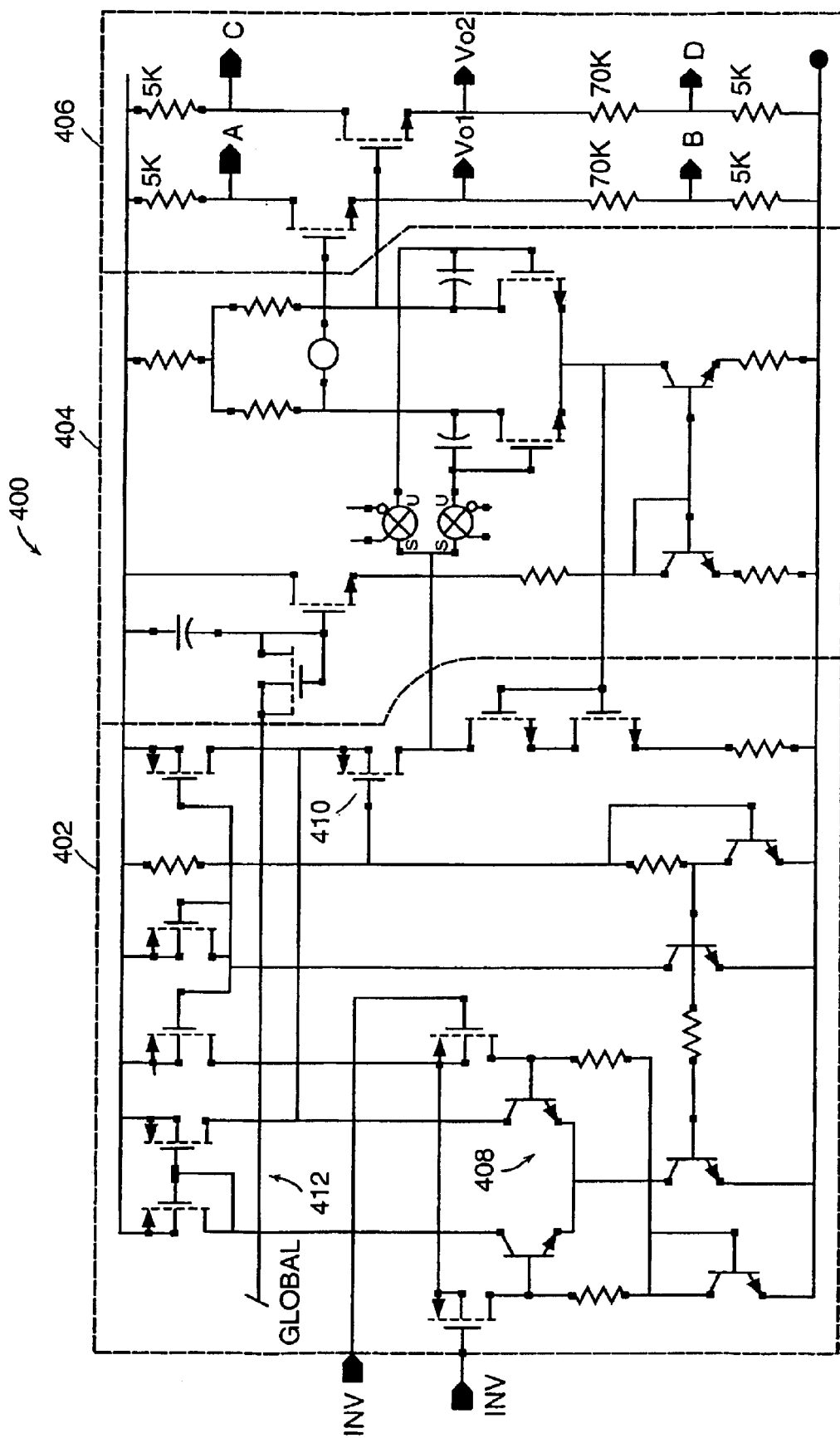

FIG. 14 is a schematic of another embodiment of the present invention. This embodiment is similar to many respects to the embodiment of FIG. 12 in that there is a single circuit 400 with an amplifier stage 402, demodulator stage 404, and driver stage 406. Amplifier stage 402 includes differential transistor pair 408, a current mirror 412, and a cascode transistor 410. The operation is essentially similar to that described above in conjunction with FIG. 12.

The circuit of FIGS. 12 and 14 have certain advantages over some of the other embodiments. All the circuitry in the feedback loop is essentially combined into one unified circuit that is little more than an opamp with a single pole. The design has low power, works with a wide supply range including at low voltage, and has a wide bandwidth. The amplifier stage and demodulator stage in this embodiment do not need to be particularly precise, as long as the scaling factor can be made accurate. Because the circuit has only a single pole, it is easy to compensate. This feedback approach removes a second order mechanical transfer function from the loop, thus making the loop stable for any beam resonant frequency or Q.

Having described embodiments of the present invention, it should be apparent that modifications can be made without departing from the scope of the invention as defined by the appended claims. For example, the structures of the accelerometer are exemplary, but other electrode structures could be used.

What is claimed is:

1. A sensor comprising:
   a first electrode;
   a first driver for providing a first periodic signal to the first electrode and having a supply voltage, the first periodic signal having peak to trough amplitude that is similar to the supply voltage;
   a second electrode;
   a second driver for providing a second periodic signal to the second electrode, the second periodic signals having a peak to trough amplitude that is similar to the supply voltage, the first and second periodic signals being 180° out of phase with respect to each other;
   a third electrode between and movable relative to the first and second electrodes, the first, second, and third electrodes forming a differential capacitor;
   means, coupled to the third electrode, and responsive to movement relative to the first and second electrodes, for providing an output signal that is fed back to the first and second driver to change an amplitude of the first periodic signal and the second periodic signal in response to the third electrode moving.

2. The sensor of claim 1, wherein the change in the amplitude of the first periodic signal causes a change in the signal on the third electrode such that the third electrode has substantially no periodic component and so that the electrostatic force between the third electrode and the first electrode is substantially equal to the electrostatic force between the third electrode and the second electrode.

3. The sensor of claim 1, wherein the first, second, and third electrodes are surface micromachined electrodes over a substrate, such that the first and second electrodes are fixed relative to the substrate and the third electrode is suspended over and laterally movable relative to the substrate.

4. The sensor of claim 1, wherein the first and second drivers provide to respective first and second electrodes square wave signals 180 degrees out of phase to each other.

5. The sensor of claim 1, wherein the amplitude of the first periodic signal is increased by a voltage V, and the amplitude of the second periodic signal is decreased by the voltage V, in response to a motion of the third electrode towards the fist electrode.

6. The sensor of claim 1, wherein the first and second drivers provide square wave signals to the first and second electrodes.

7. The sensor of claim 6, wherein the first driver provides a square wave between a non-zero voltage v and $V_s$–v, where $V_s$ is the supply voltage and is much greater than v, so that the average value of the square waves from the first driver is $V_s/2$.

8. A sensor comprising:
   a first fixed electrode;
   a second fixed electrode;
   a movable electrode between the first fixed electrode and the second fixed electrode to form a differential capacitor; and
   a feedback circuit feeding back a signal on the movable electrode to the first and second electrodes, the first and second electrodes signals each having a periodic signal with a full range close in amplitude to that of a supply voltage for the feedback circuitry;
   wherein the feedback circuit is constructed so that the feedback signal causes the signal on the movable electrode to have substantially no periodic component.

9. The sensor of claim 8, wherein the first and second periodic signals are square waves that are 180 degrees out of phase with respect to each other, the movable electrode having a periodic signal in response to movement relative to the first and second fixed electrodes but for the feedback, wherein the feedback causes there to be substantially no periodic signal on the movable electrode.

10. A sensor comprising:

a first fixed electrode;

a second fixed electrode;

a movable electrode between the first fixed electrode and the second fixed electrode to form a differential capacitor; and a feedback circuit feeding back a signal on the movable electrode to the first and second electrodes, the first and second electrodes signals each having a periodic signal with a full range close in amplitude to that of a supply voltage for the feedback circuitry;

wherein the amplitude of the first periodic signal is increased and the amplitude of the second periodic signal is decreased by an equal amount, wherein the first and second periodic signals are provided such that the AC signal on the movable electrode is nulled and a difference in electrostatic forces between the movable electrode and each of the first and second fixed electrodes is substantially eliminated.

11. A micromachined device comprising:

a substrate;

a mass suspended over the substrate and laterally movable relative to the substrate, the mass including a movable electrode;

a first fixed electrode suspended over the substrate and not movable relative to the substrate;

a second fixed electrode suspended over the substrate and not movable relative to the substrate, the movable electrode and the first and second fixed electrode forming a differential capacitor;

an amplifier coupled to the movable electrode to provide an amplified signal;

a demodulator coupled to the amplifier to receive the amplified signal and to provide a demodulated signal;

means for receiving the demodulated signal and for providing a first output voltage and first and second feedback voltages, the feedback voltages being related to the output voltage; and a first switch for alternately providing the first and second feedback voltages to the first fixed electrode to provide a periodic signal to the first fixed electrode.

12. The device of claim 11, wherein the providing means further provides a second output voltage and third and fourth feedback voltages, the device further including a second switch for alternately providing the third and fourth feedback voltages to the second fixed electrode.

13. The device of claim 11, wherein the providing means includes first, second and third resistors in series between two fixed voltage supplies, the first and third resistors being equal in resistance and less than the second resistor by a scaling factor.

14. The device of claim 11, further comprising a second movable electrode and third and fourth fixed electrodes, wherein the amplifier includes a differential transistor pair, and wherein the first and second movable electrodes are connected to separate transistors in the transistor pair.

15. The device of claim 11, wherein the movable electrode extends along a first direction, the mass having a second movable electrode extending in a second direction perpendicular to the first direction, and third and fourth fixed electrodes that form a second differential capacitor.

16. The device of claim 15, wherein the circuit includes a second demodulator and a second scaling stage for providing feedback signals to the third and fourth fixed electrodes.

* * * * *